(12) United States Patent  (10) Patent No.: US 7,588,611 B2
Lindgren et al.  (45) Date of Patent: Sep. 15, 2009

(54) METHOD AND APPARATUS FOR SUPPRESSING SPARKS

(75) Inventors: Ross A. Lindgren, Centennial, CO (US); William O. Irvine, Lakewood, CO (US)

(73) Assignee: Blender Products, Inc., Denver, CO (US)

( * ) Notice: Subject to any disclaimer, the term of this patent is extended or adjusted under 35 U.S.C. 154(b) by 0 days.

(21) Appl. No.: 12/147,266

(22) Filed: Jun. 26, 2008

(65) Prior Publication Data

US 2008/0277126 A1   Nov. 13, 2008

Related U.S. Application Data

(63) Continuation of application No. 11/064,657, filed on Feb. 23, 2005, now Pat. No. 7,416,573.

(51) Int. Cl.
*B01D 45/12*  (2006.01)
(52) U.S. Cl. .............................. 55/315; 55/443; 55/456; 55/482; 55/DIG. 20
(58) Field of Classification Search ................... 55/315, 55/318, 394, 443, 456, 457, 447, 482, DIG. 20
See application file for complete search history.

(56) References Cited

U.S. PATENT DOCUMENTS

| 186,345 | A |   | 1/1877  | Hudson  |        |
|---------|---|---|---------|---------|--------|
| 233,171 | A |   | 10/1880 | Arrester |       |
| 2,036,127 | A | | 3/1936  | Edholm  |        |
| 3,009,539 | A | * | 11/1961 | Papp    | 55/452 |
| 3,546,854 | A | | 12/1970 | Muller  |        |
| 3,831,318 | A | | 8/1974  | Richmond |       |
| 4,077,567 | A | | 3/1978  | Ginn et al. |    |
| 4,266,955 | A | | 5/1981  | Hackney |        |
| 5,463,967 | A | | 11/1995 | Gielow et al. |  |
| 5,536,207 | A | | 7/1996  | Robinson et al. ||
| 5,645,481 | A | | 7/1997  | Robinson et al. ||
| 5,678,638 | A | | 10/1997 | Baker    |       |
| 5,702,244 | A | | 12/1997 | Goodson et al. ||
| 5,931,227 | A | | 8/1999  | Graves   |       |
| 6,139,425 | A | | 10/2000 | Yazici et al. | |
| 6,547,433 | B2 | | 4/2003 | Yazici et al. | |
| 6,595,848 | B1 | | 7/2003 | Robinson |       |
| 6,878,056 | B2 | | 4/2005 | Robinson |       |

FOREIGN PATENT DOCUMENTS

WO   WO 2004/079165   9/2004

* cited by examiner

*Primary Examiner*—Robert A Hopkins
(74) *Attorney, Agent, or Firm*—Sheridan Ross P.C.

(57) ABSTRACT

A spark suppression device includes a plurality of blades or vanes that are mounted transversely in a duct of an air handling/dust collection system communicating with a spark source. A controlled flow of air carries sparks from the spark source through the spark suppression device. Sparks are suppressed by turbulence created in the airstream from the blades that have a downstream curvature. The turbulence strips away a hot air bubble surrounding a spark ember, thereby effectively cooling the spark and significantly reducing combustion at the spark ember. Other attributes of the invention contributing to spark suppression include an overlapping arrangement of the blades that results in high-velocity impact of the sparks against the blades, thereby breaking up the spark embers into smaller embers, and creation of rapid increased pressure within the spark suppression device that also helps to strip away the spark ember from the surrounding hot air bubble.

15 Claims, 6 Drawing Sheets

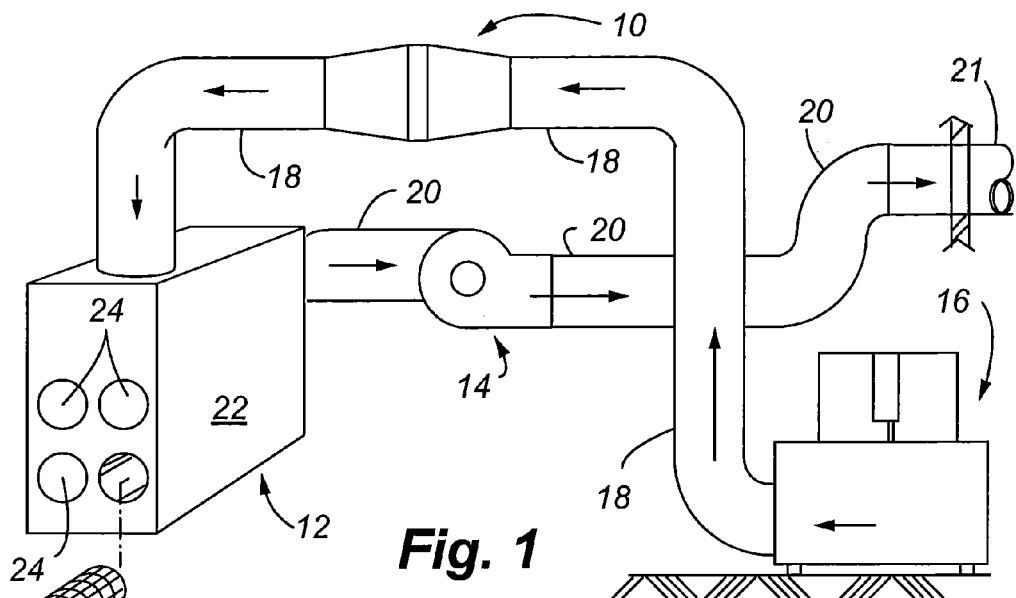
Fig. 1
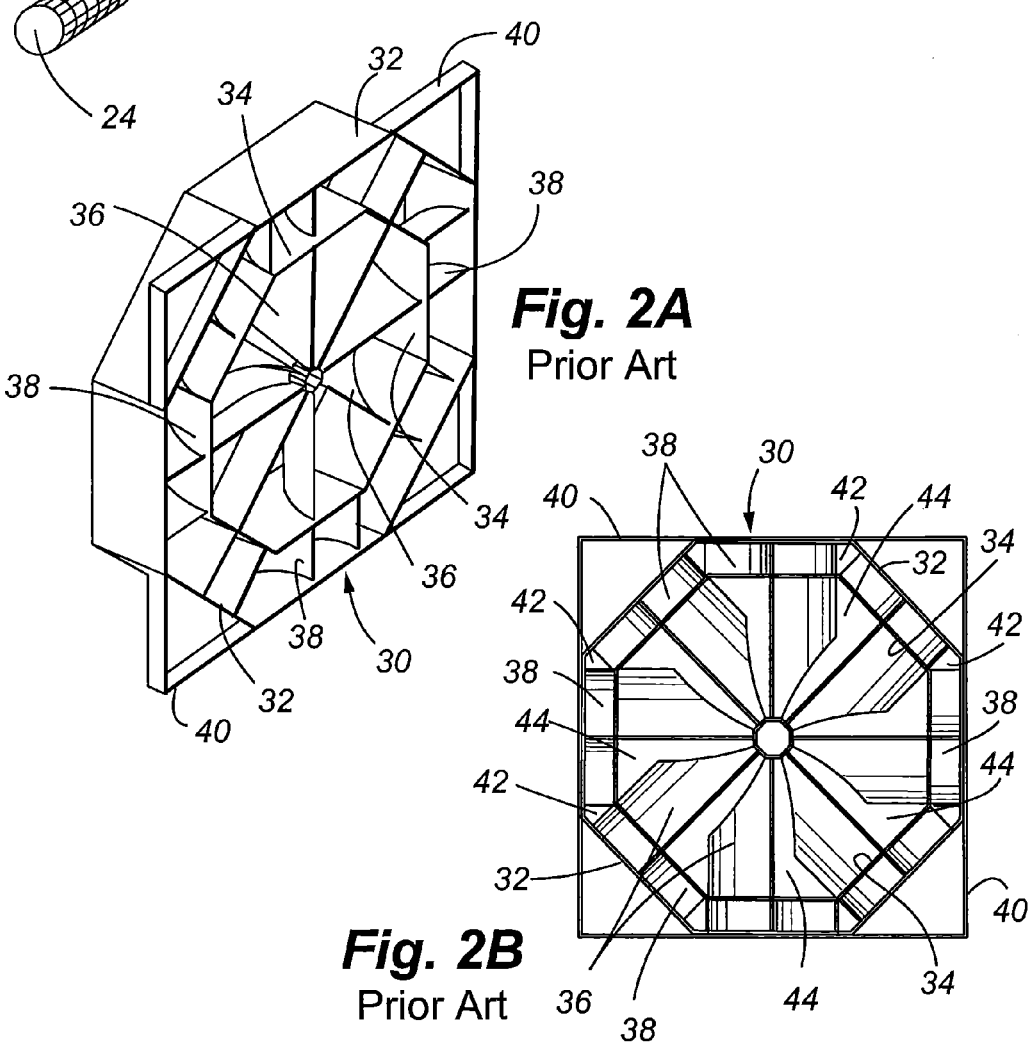
Fig. 2A
Prior Art
Fig. 2B
Prior Art

METHOD AND APPARATUS FOR SUPPRESSING SPARKS

CROSS REFERENCE TO RELATED APPLICATION

This is a continuation application of application Ser. No. 11/064,657 entitled "Method and Apparatus for Suppressing Sparks" filed on Feb. 23, 2005 now U.S. Pat. No. 7,416,573, the entire disclosure of which is incorporated herein by reference.

FIELD OF THE INVENTION

The present invention relates to devices that manage, control, or suppress sparks, and more particularly, to a method and apparatus for suppressing sparks that are produced in industrial processes and become conveyed in air handling systems and dust collection systems.

BACKGROUND OF THE INVENTION

There are many industrial processes that result in the production of sparks, either actively, passively or accidentally. Active production of sparks include those processes that generate a tremendous quantity of sparks, for example, welding and plasma cutting operations. Passive production of sparks refers to processes that are known to periodically generate sparks, yet spark production is relatively infrequent, for example a drying process that produces sparks primarily during startup and shutdown periods of operation. Accidental spark production refers to spark generation as the result of an accidental occurrence, for example, sparks are generated by the impact between two objects in an industrial process, and then the sparks become entrained in a process airstream. In many of these processes, the sparks are conveyed in a dust collection or air handling filtration system that treats the air surrounding the industrial process. The sparks are relatively small embers of burning substances discharged from a body in combustion. These sparks can cause damage to dust collection and filtration systems. For example, in a dust collection system, nuisance sparks carried downstream in a duct can burn through-holes in the filtration system's filter media, resulting in hazardous fires, or at a minimum, degradation in the filtration system's ability to effectively treat the air stream. Relatively large sparks are capable of also igniting combustible dust that may collect on the filter media, potentially causing catastrophic fires. Even without such fires, smaller sparks may burn-damage the filter media, requiring frequent replacement of the filter media, thereby significantly adding to the cost of operating and maintaining the filtration system.

Conventional spark detection and extinguishment systems for reducing the threat and incidence of fire are typically complex and may involve the application of a chemical retardant and/or water to the affected area upon detection of a spark(s). These conventional suppression systems are expensive, vulnerable to drift, tampering and malfunction. Additionally, activation of these systems often results in compromising the filtration system, because the system may need to be cleaned to remove the extinguishing substances and/or the byproducts of mixing and reacting of extinguishing substances with particulates in the process stream. Conventional extinguishment systems often use water deluge; these systems may be incompatible and potentially hazardous with particulate loading (i.e., some metal dusts) in certain industrial air streams. Also, filter media wetted in deluge systems may need to be removed and replaced with dry filter media, incurring significant maintenance costs and operational downtime.

Particularly for those industrial processes that take place on a smaller scale, incorporating known spark suppression systems is prohibitively expensive; therefore, there are few economically viable options available for smaller scale operations to have effective spark suppression capability.

Therefore, there is a need to provide a simple, economical and effective spark suppression system that may be easily and affordably installed in both large and small-scale industrial processes.

SUMMARY OF THE INVENTION

In accordance with the present invention, a spark suppression device is provided that effectively extinguishes sparks, yet is easily installed in any duct of an industrial process, such as air handling or dust collection systems, hereinafter collectively referred to as air handling systems. The term "suppress" as used herein shall mean the general management or control of sparks to include, but not limited to, the ability to extinguish and arrest sparks in an industrial process. According to a preferred embodiment, the spark suppression device is in the form of a static mixer or turbulator device that is mounted within the duct of the air handling system upstream of the filter media. The static turbulator includes a plurality of vanes or blades that extend substantially transverse to a general direction of air flow through the duct. The device extinguishes sparks by taking advantage of various thermo-fluid principles discussed further below, as well as by physical impact of the sparks against the blades of the device.

Most sparks created in the industrial processes are small and burn out almost immediately on their own, thus not causing any damage to the air handling system. Nevertheless, some sparks are indeed large enough and hot enough to be conveyed through ductwork for relatively long distances. These sparks are typically between 100-200 microns in size. Because spark embers are buoyant due to a bubble or casing of hot air that surrounds each spark, sparks in this size range may travel relatively long distances in ductwork. Thus, sparks may move at velocities that substantially match the air stream, until the spark is arrested against the filter media. Upon contacting the filter media, the hot air bubbles get stripped from the spark embers, leaving the burning embers in contact with the combustible filter media. If a spark is large enough and hot enough, the filter media will ignite, and so too will combustible dust caked on the filter media. Sparks generated from many well-known industrial processes may have temperatures between 700-1400 deg. F. It is also known that a spark measuring approximately 150 microns in diameter and over 700 deg. F. can provide enough heat to start a fire or burn a sizeable through-hole in filter media. The actual spark ember may have a temperature between 1200-1400 deg. F., and the bubble or casing around the ember may be between 700-800 deg. F.

The spark suppressor of the present invention takes advantage of various thermo-fluid principles to extinguish sparks. One attribute of the present invention that helps to extinguish sparks is disruption of the spark ember/hot air bubble equilibrium. A spark passing through the spark suppressor is subjected to a sudden increased pressure that disrupts the hot air bubble surrounding the spark ember. This pressure increase is due to a decreased air velocity of the airstream as it passes across an enlarged entrance section of the spark suppressor. This enlarged entrance section can also be described as providing a sudden entrance expansion, thereby creating the pressure increase. Accordingly, the ember/hot air bubble equilibrium is disrupted under the influence of increased pressure and becomes unstable, and the spark ember begins to separate from the hot air bubble. The cooler air that subsequently surrounds the spark ember more rapidly transfers heat away from the ember and thereby helps to extinguish the spark.

Another attribute provided by the present invention can be referred to as a "sling-shot" effect or momentum conservation that also helps to separate the spark ember from the hot air bubble. Due to expansion as mentioned above, the airstream velocity on the upstream side of the turbulator decreases rapidly in approaching blades of the turbulator. However, because a spark ember is of much greater density than the surrounding airstream, the ember, in maintaining momentum, separates from the surrounding hot air bubble. Thus, the spark ember is slung forward and away from the slower moving hot air bubble. Therefore, in addition to the increased pressure that helps to strip away the hot air bubble from the spark, the momentum of the spark ember itself also helps to separate the hot air bubble from the spark ember.

Another attribute of the present invention that helps extinguish sparks is the turbulence created by the blade arrangement as the sparks travel downstream beyond the device. The swirling and counter-swirling blade arrangement greatly increases turbulence downstream of the spark suppressor that contributes in extinguishing spark embers, because a source of cooler air continually swirls around the ember, rapidly transferring heat away by convection. Turbulent air enveloping the sparks is of sufficient magnitude that extinguishes sparks in a manner similar to a person blowing out the already dying flame of a candle.

Yet another attribute of the present invention that helps extinguish sparks is the physical contact/impact of the spark embers against the blades of the device. The blades are preferably arranged such that the leading edge of each blade overlaps the trailing edge of one adjacent blade when viewing the device along a longitudinal path through the duct passageway. Thus, open gaps between the blades as viewed in the longitudinal direction are effectively eliminated. Accordingly, the great majority of spark embers will physically impact the blades. Depending on the speed of the spark embers, contact of the embers against the blades can cause the embers to break up and disintegrate into smaller-sized embers, which overall provides larger surface area for convecting heat, thereby cooling the spark faster. Also, contact of the spark embers against the blades rapidly slows their speed and causes them to drop out of the airstream sooner than if they were still moving unimpeded with the airstream. Thus, if the spark suppression device is placed far enough upstream of an air filtration unit, many sparks will not travel the distance required to contact the filter elements.

Yet another attribute of the present invention that helps to extinguish sparks is the redirecting effect of the blades' curvature wherein spark embers conveyed across the static mixing portion of the spark suppressor are redirected from largely a longitudinal path of travel to a path of travel that has a radial component. With a radial component in the path of travel, the spark embers impact the inside walls of a downstream converging section of the spark suppressor and/or the inside walls of the downstream duct that adjoins the converging section.

There are a number of factors that affect the performance of the spark suppressor device. One factor is the particular arrangement, size, and curvature of the blades. Smaller blades with less curvature create less pressure drop across the device as compared to larger blades with greater curvature. Spark embers extinguish quickly upon impacting a surface; a spark suppressor with overlapping blades virtually eliminates the chance that a spark may pass through without impacting blade surfaces. Typically, the greater the blade overlap, the larger the blade required, which results in higher pressure drop for the same airstream flow rate.

Another factor affecting performance is airstream velocity. At less than approximately 400 fpm airstream velocity in the duct (duct velocity), the turbulator is appreciably less effective in creating sufficient turbulence downstream to suppress sparks. At duct velocities in excess of 7,500 fpm, the blades are less effective in creating sufficient turbulence downstream to suppress sparks; at duct velocities greater than 7,500 fpm, gaps between the blades behave more as orifices, which reduces the influence of blade curvature. Also, at high velocities, the pressure drop across the spark suppressor is exceedingly high. The spark suppressor of the present design should ideally be operated at duct velocities between 1000 to 6000 fpm to achieve maximum spark suppression. Most industrial processes are designed and operated at duct velocities between 1000 to 6000 fpm. Therefore, with respect to duct velocity, pressure drop and spark suppression, the present invention is ideal.

The spark suppressor of the present invention is successful in suppressing sparks by rapidly lowering the temperatures of the sparks to within 50 deg. F. of the surrounding airstream, and wherein the spark suppressor operates at pressure drops of 1 inch water gage or less for duct velocities less than 4000 fpm. The present invention offers a lower pressure drop alternative over conventional spark drop-out boxes. The present invention operates under a lower pressure drop and therefore lowers power requirements, thus energy costs are significantly reduced.

In addition to suppressing sparks, the static mixing portion of the spark suppressor also destratifies temperature and concentration gradients; therefore, in applications where relatively high temperatures may threaten to cause duct fires, the device rapidly drives localized extreme high temperature in the flow stream toward the average temperature and thereby decreases the threat of fire. In applications where the concentration of particulate and other constituents elevate locally to lower explosive limits, there is threat of fire. The static mixing portion of the device decreases this threat of fire by homogenizing particulate concentration, which prevents concentrations from reaching lower explosive limits.

The monolithic design of the present invention has no moving parts that could potentially malfunction, which is most favorable for seeking absolute fire and burn-damage prevention. Being integral to the duct work, the spark suppressor does not rely on any auxiliary power or controls, rather, it is always working whenever the fan of the air handling system is running, which results in 100% spark detection and 100% response to sparks.

Other features and advantages of the present invention will become apparent from review of the following detailed description taken in conjunction with the drawings.

BRIEF DESCRIPTION OF THE DRAWINGS

FIG. 1 is a schematic diagram of an air handling system incorporating a spark suppression device of the present invention;

FIGS. 2A and 2B illustrate an example of a prior art spark suppressing device;

DETAILED DESCRIPTION

Figure 3:
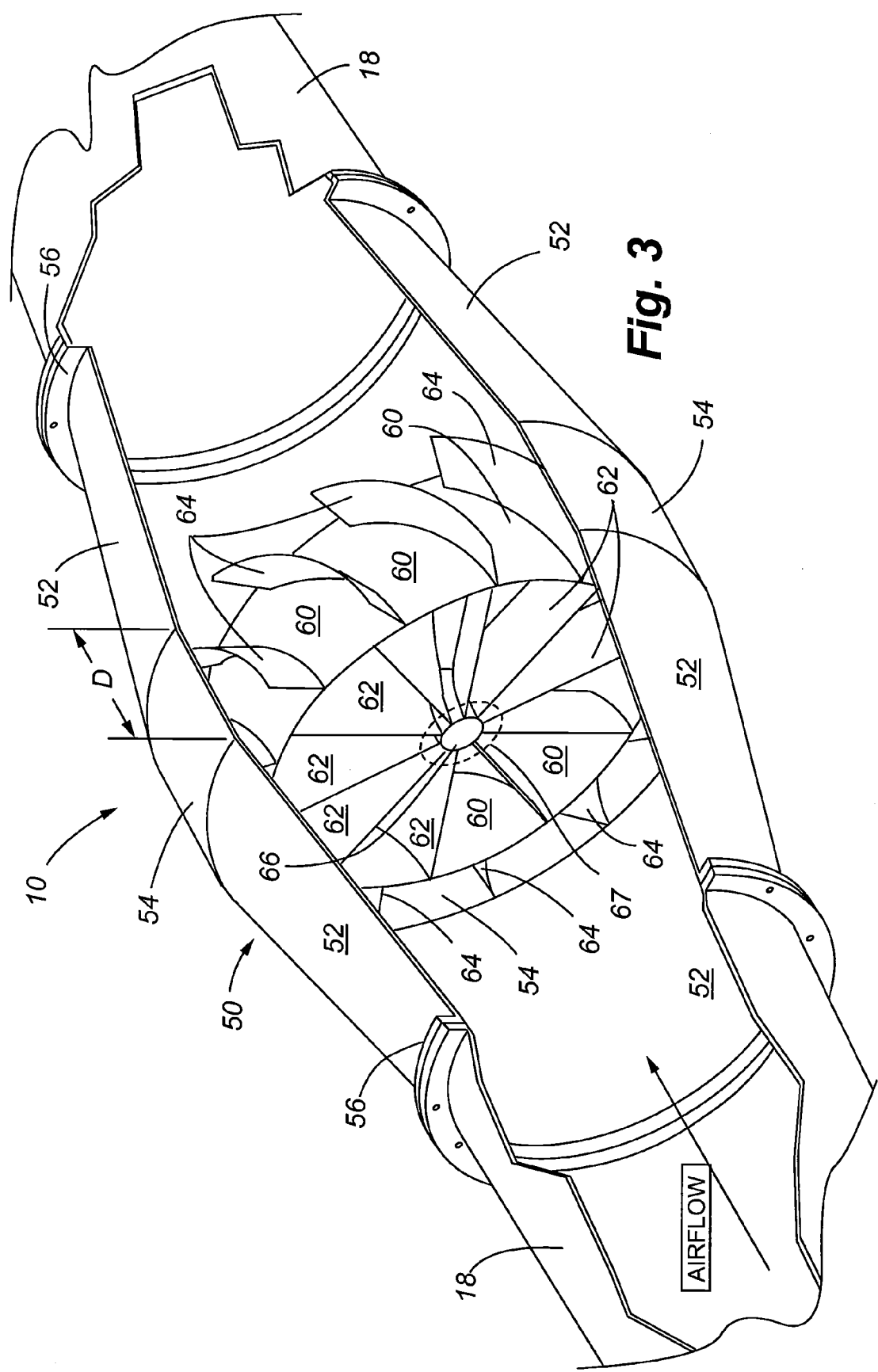
FIG. 3 is a perspective view of a first preferred embodiment of the spark suppression device of the present invention installed within a length of duct.

Referring to FIG. 1, the spark suppressor 10 of the present invention is illustrated as being installed within an air handling system. A typical air handling system includes the machine/process 16 which generates sparks, either actively, passively or accidentally, and a filtration inlet line/duct 18 which conveys contaminated air and sparks to a filtration unit 12. The filtration unit 12 includes a filter housing 22, and one or more filter elements 24. In this particular system, the filter elements 24 are shown as cartridge-type filters, which are replaced periodically over time as they become clogged/caked over with particulate. A filtration outlet line/duct 20 allows conveyance of filtered air back into the environment through discharge exit duct 21. A fan 14 draws the airstream through the filtration unit. The fan 14 is representative of any standard process fan providing enough power to draw airflow through the system and to thereby draw particulate away from the machine/process 16, so that particulate carried in the airstream can be treated within the filter unit 12.

FIGS. 2A and 2B are representative of the closest known prior art. This prior art consists of an air mixing apparatus 30 typically used in heating, ventilating and air conditioning (HVAC) systems for statically intermixing stratified airstreams, thereby improving the heating/cooling efficiency of the HVAC system. One such prior art air mixing apparatus has been installed at an industrial location for spark suppression on an industrial process. The structure of this static air mixing apparatus is defined by an outer sleeve or wrap 32 that houses a plurality of outer vanes 38. An inner sleeve or wrap 34 houses an inner set of vanes 36. A support panel 40 is sized to match the shape of the particular duct in which the static air mixing device is installed.

Although the prior art illustrates a static air mixing device that has been used for spark suppression, the particular design considerations for a static air mixing device versus that of the spark suppression device of the present invention are significantly different. For example, with respect to the prior art shown in FIG. 2B, the outer set of vanes 38 have substantial gaps 42 between some blades when viewed longitudinally. Similarly, there are relatively large gaps 44 that exist between the inner set of blades 36 when viewed longitudinally. Because of these large gaps, a significant number of sparks may pass unimpeded through the prior art spark suppression device, and consequently, the sparks are conveyed down the duct where they may potentially cause ignition and combustion. Whereas, in the present invention with overlapping blades, sparks inevitably impact the blades. Additionally, because of the overall geometry and gaps between the blades, the pressure drop across the prior art static air mixing device is less than that of the present invention. Accordingly, any inherent spark suppression benefits achieved by the prior art device due to spark equilibrium disruption or momentum conservation are significantly less in comparison to the present invention. Thus, the only attribute of the prior art device that absolutely contributes to spark suppression is the downstream turbulence of the airstream created by the blades of the prior art device. Therefore the present invention is superior over the prior art in suppressing sparks, thereby reducing the risk of sparks threatening life and damaging property.

Referring to FIG. 3, the spark suppression device 10 of the present invention is characterized by a static mixer portion including set of inner vanes/blades 62, a set of outer vanes/blades 64, and an intermediate sleeve or wrap 60 interconnecting the distal ends of the inner set of blades to the proximal ends of the outer set of blades. The distal ends of the outer set of blades abut the interior surface of the outer sleeve or wrap. The inner set of blades 62 converge at their proximal ends and are joined by a central hub 66. The inner set of blades 62 have a curvature in the downstream direction as shown, and the outer set of blades 64 have different curvature to the inner set of blades 62, yet also a curvature in the downstream direction. The embodiment of FIG. 3 provides inter-mixing of an airstream passing through the duct to effect destratification of the airstream.

Referring again to FIG. 3, the static mixing portion of the spark suppression device 10 is preferably mounted between upstream and downstream transition sections 52. The transition sections 52 may also be referred to as spark cones, or simply as sections of duct that increase in diameter as they approach the static mixer portion. As shown in FIG. 1, the cones 52 are mounted in line with the filtration inlet duct 18. The device 10 preferably includes a pair of these spark cones 52. An outer sleeve or wrap 54 interconnects the adjacent ends of the transition members 52. The smaller-diameter openings at opposite ends of spark cones may include a flange 56 enabling the transition members to mount in line with an existing duct. In lieu of flanges 56, the transition members may include other means of connection so that the transition members may mount in line with the adjacent upstream and downstream sections of duct.

Figure 4:
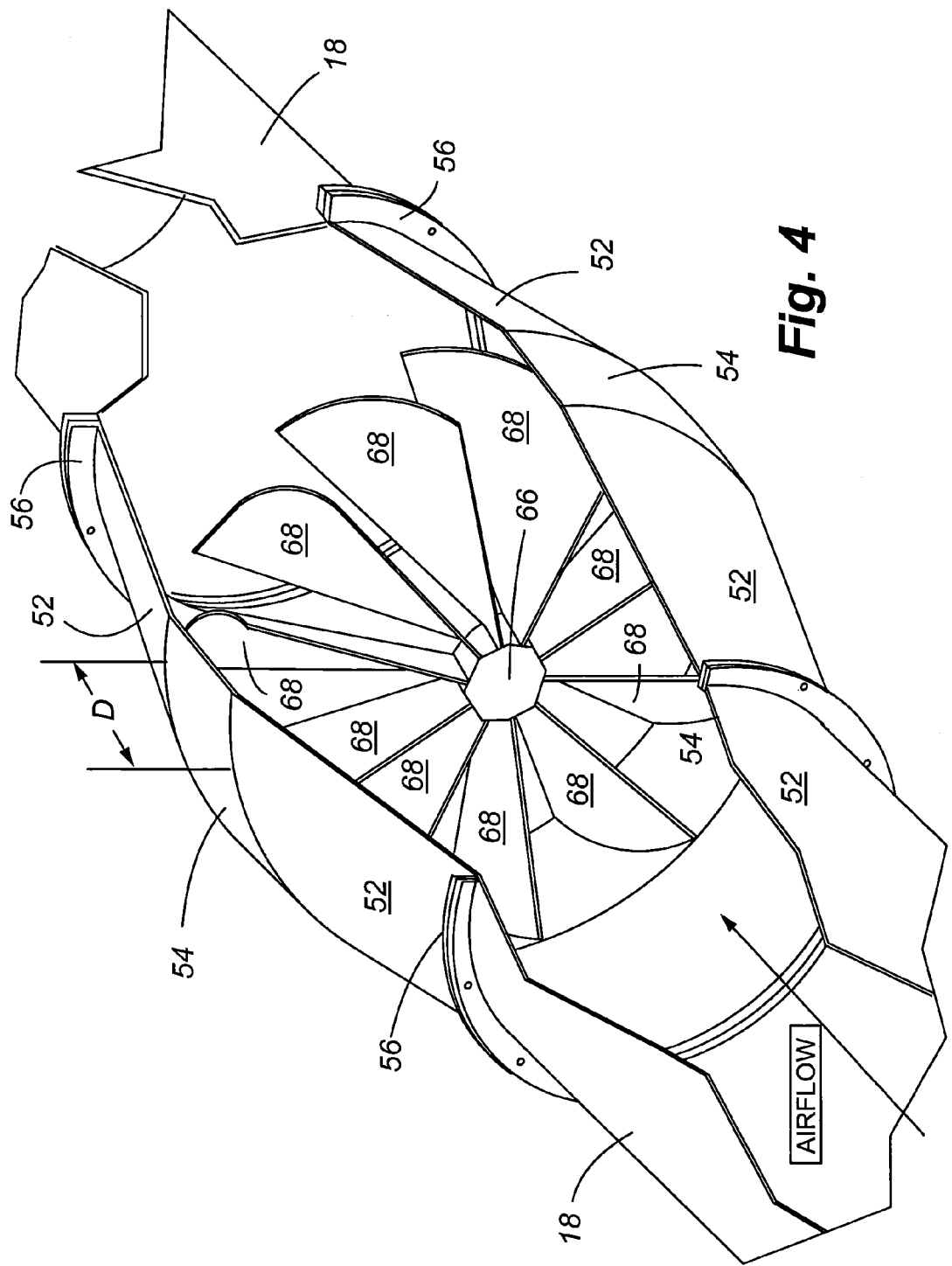
FIG. 4 is a perspective view of a second preferred embodiment of the spark suppression device of the present invention.

FIG. 4 illustrates another preferred embodiment of the present invention. In this preferred embodiment, there is a single set of blades 68 that extend from the central hub 66 to the inner surface of the outer wrap 54. This simplified version of the spark suppression device of the present invention provides adequate intermixing of the airstream and at least equal capability with respect to spark suppression by disruption of spark equilibrium by momentum conservation. The hub 66 in FIG. 4 is also larger than the hub 66 in FIG. 3. As discussed further below, some additional spark suppression benefits may be achieved with a larger hub.

Referring back to FIG. 3, the hub 66 may be modified to include a blocking or center plate 67, shown in dashed lines, that is attached over the leading edge of the hub 66. The center plate 67 prevents sparks from passing unimpeded through an otherwise more open center area. Use of a center plate also causes sparks traveling generally along the longitudinal center axis of the airstream to be deflected radially outward, thus causing the sparks to make contact with the more radially outward lying portions of the inner blades. This radial deflection of a spark, being transverse to the longitudinal centerline of the duct, is a result of vortex shedding of the airstream created by the blocking effect of the center plate. The enlarged hub 66 of FIG. 4 can also achieve some of the same benefits of the blocking plate 67 since some of the center open area is covered by the enlarged hub.

Figure 5:
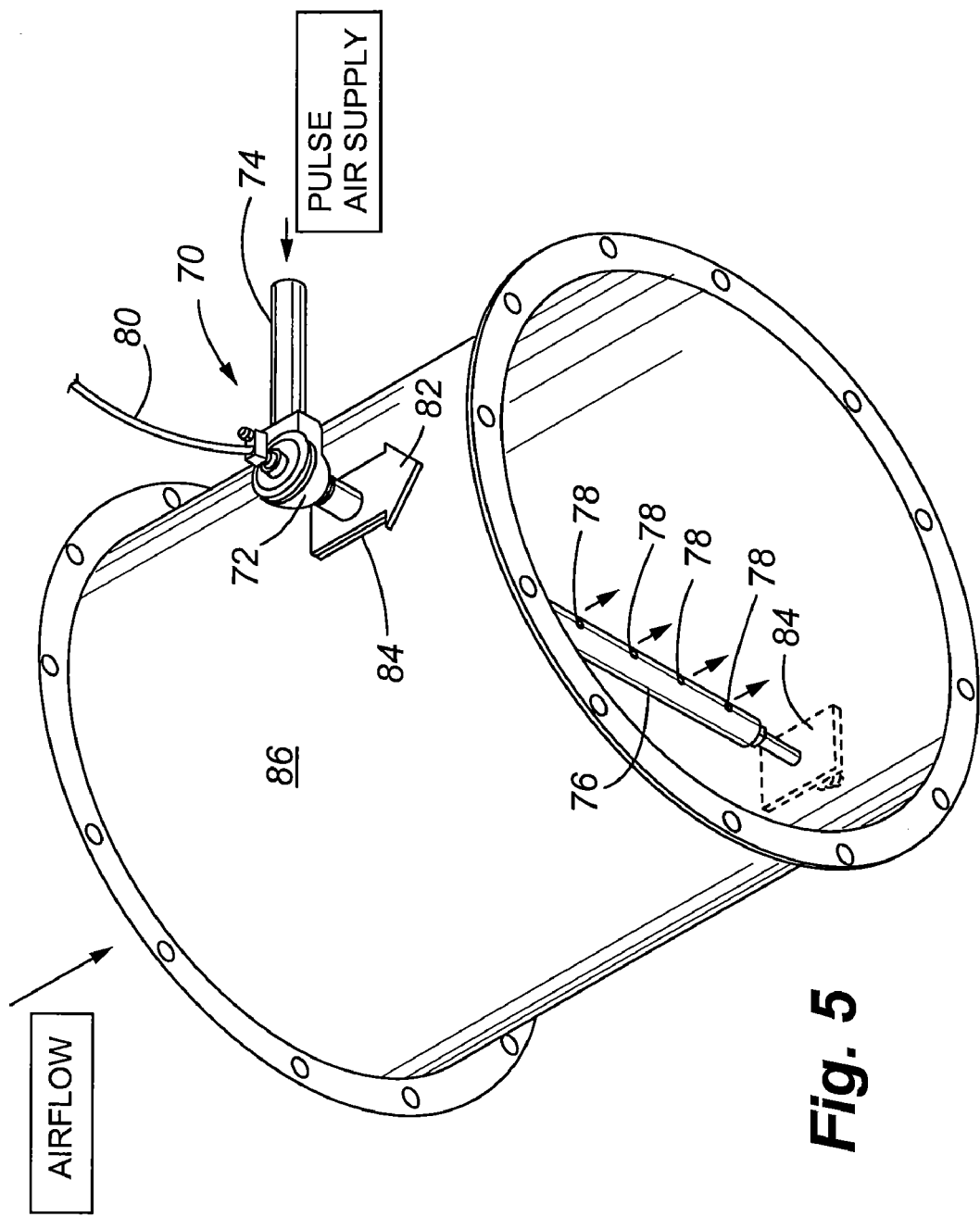
FIG. 5 is a perspective view of an air booster assembly that can be used in conjunction with the spark suppression device in order to help clean the blades of the device.

FIG. 5 illustrates an air booster assembly 70 that can be used to apply a pulse of compressed air across the spark suppression device, thereby helping to clean particulate and debris that may adhere to the blades. Therefore, there may be a need to periodically remove the adhered material from the blades by providing a pulse of air (by automatic or manual means) that effectively dislodges the particulate and debris from the blades. The air booster assembly 70 includes a pulse valve 72 and a supply of compressed air/fluid connected to the valve that is delivered via pipe 74. A pulse distribution pipe 76 is mounted transversely within a section of duct 86 just upstream of the spark suppression device 10. The pulse distribution pipe includes one or more orifices 78 that release a pressure wave through the duct and against the spark suppression device 10. A control line 80 (either electric or pneumatic) is used to selectively control the operation of valve 72 for delivering a desired frequency and duration of pulse air. Conveniently, a pulse orifice alignment indicator 82 may be mounted to the pulse distribution pipe 76 enabling a user to confirm the direction that the orifices 78 face. Preferably, the pulse distribution pipe extends through the center of the duct section 86. Openings may be formed through the duct walls allowing the ends of the pipe 76 to pass therethrough. A sealing gasket 84 may be used to seal the openings in the duct with respect to the installed distribution pipe 76. The control line 80 may communicate with either an industrial controller (not shown) for automatic pulse control, or to a manual switch (not shown), which would allow an operator to selectively control passage of compressed air/fluid through the valve 72.

Figure 6:
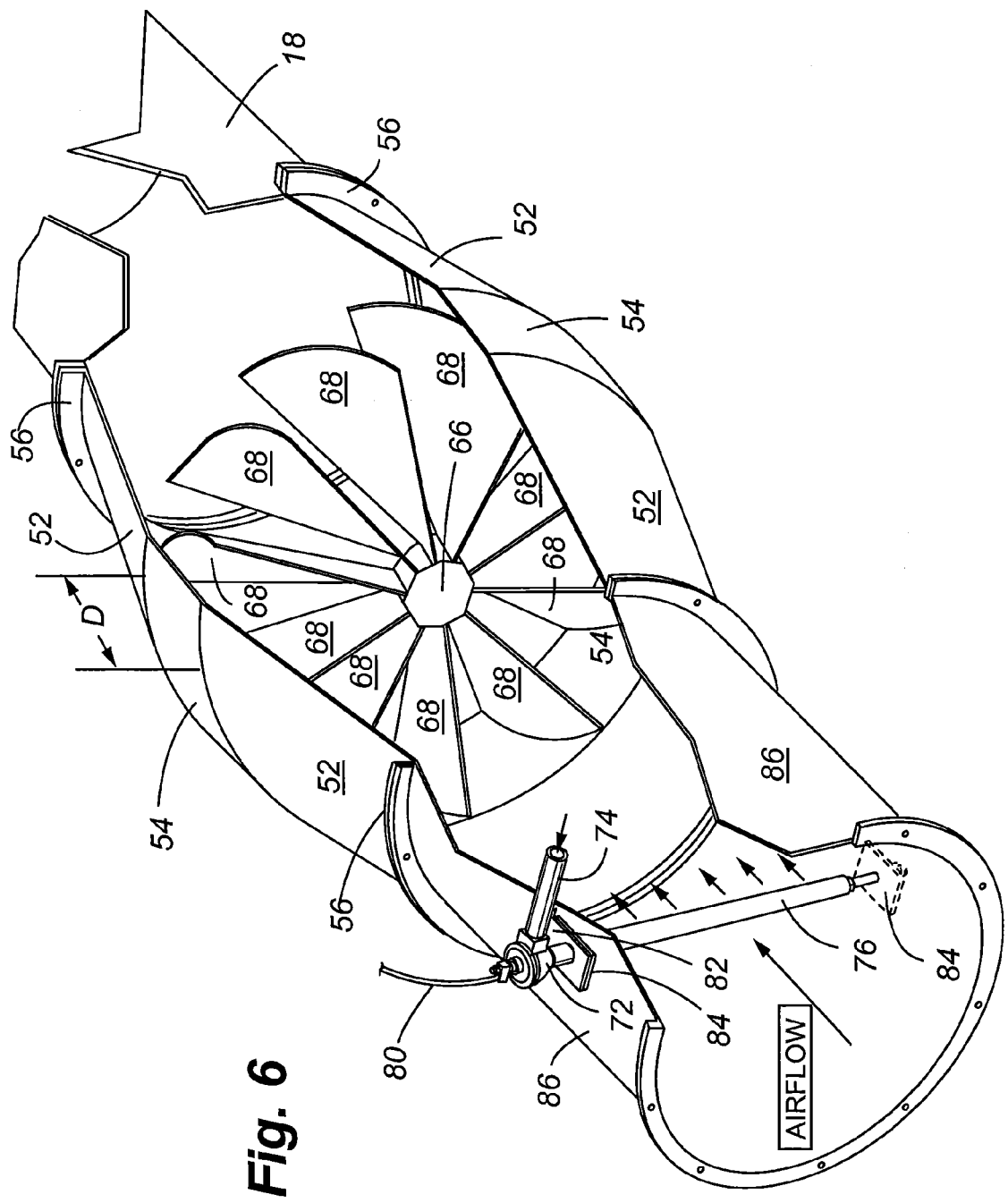
FIG. 6 is a perspective view of the air booster assembly installed upstream of the spark suppression device.
Figure 7:
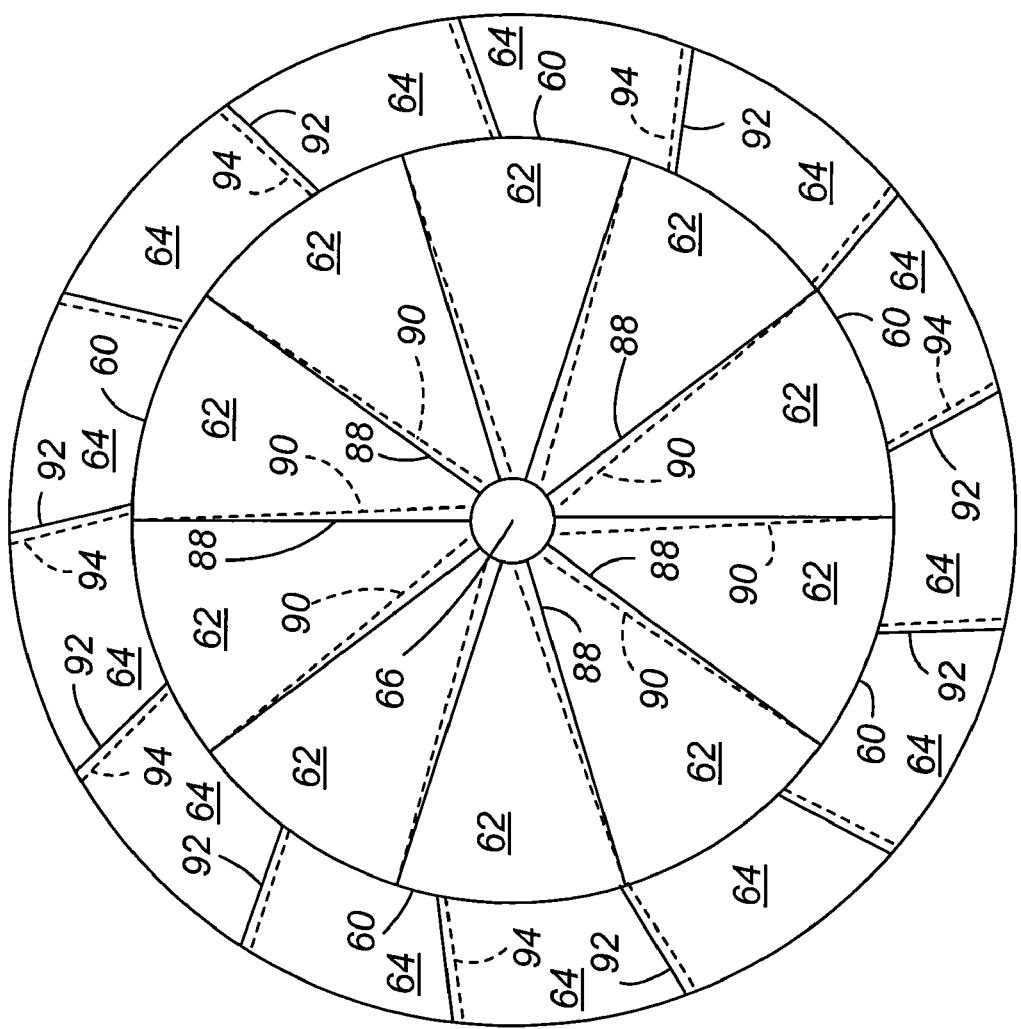
FIG. 7 is a front or upstream elevation view of the spark suppression device of the present invention further illustrating the arrangement of the blades and particularly the overlap of the blades to eliminate open gaps as viewed longitudinally through the device.

Referring to FIG. 6, an elevation view taken along a longitudinal centerline of the preferred embodiment of FIG. 3 is illustrated. The leading or upstream edges 88 of the inner set of blades 62 are illustrated as continuous lines, while the trailing or downstream edges 90 of the blades 62 are illustrated as dashed lines. As shown, when viewed along the longitudinal centerline, for each inner blade, there is a definable overlap between the leading edge 88 of each inner blade and the trailing edge 90 of one adjacent inner blade. As the inner blades extend radially outward, the overlap may decrease; however, there is preferably no clear open gap between adjacent blades, which prevents sparks having a linear path of travel to pass unimpeded therethrough. Although it is theoretically possible for a spark to pass through the spark suppression device without actually contacting a blade, such clear passage could only occur if the spark rapidly changed direction as it passed through the device, which is a highly unlikely event at any flow rate. As previously mentioned, because a spark ember has a density greater than the surrounding airstream, the spark ember tends to maintain its linear direction of travel through the duct; therefore, the overlapping blade arrangement of the preferred embodiment causes virtually all sparks to make contact with the blades.

Also shown in FIG. 6 is the particular arrangement of the outer set of blades 64. The leading or upstream edges 92 of the outer set of blades 64 are illustrated as continuous lines, while the trailing or downstream edges 94 of the blades 64 are illustrated as dashed lines. A definable overlap also exists with respect to the leading edge of each outer blade and the trailing edge of one adjacent outer blade. Again, this overlap virtually eliminates the likelihood that a spark may simply pass through the outer set of blades without contacting the blades. In general, an increase in the depth of the blades, as measured by "D" in FIGS. 3 and 4, requires less curvature to achieve the same overlap between adjacent blades in preventing unobstructed passage of sparks.

By the foregoing described invention, it is shown that a static spark suppression device is provided that effectively suppresses sparks to prevent fire and burn damage to air handling and dust collection systems. While the invention has been described with respect to preferred embodiments, it shall be understood that various changes and modifications may be effected that fall within the scope of the claims appended hereto.

What is claimed is:

1. A spark suppressor for suppressing sparks moving through a duct having walls defining a passageway, said spark suppressor comprising:
   a plurality of stationary vanes extending away from a center area of said passageway, said plurality of vanes having at least one vane that extends to contact said duct, said vanes each having a downstream curvature causing air flowing therethrough to be intermixed, and wherein each vane has a leading edge and a trailing edge, said leading edge of at least one vane overlapping a trailing edge of an adjacent vane when viewing said suppressor from a longitudinal direction; and
   a filtration system including a filter housing, a plurality of filtration elements removably mounted in said filter housing, an inlet duct connected to said filter housing for conveying particulate to be filtered, an outlet duct connected to said filter housing for conveying filtered air away from said filter housing, and means communicating with said filter housing for providing a flow of air through said filtration elements;
   and wherein said spark suppressor is mounted in line with said inlet duct.

2. A spark suppressor, as claimed in claim 1, further including:
   a central hub interconnecting proximal ends of said inner vanes.

3. A spark suppressor, as claimed in claim 2, wherein: said central hub includes a center plate that extends radially outward therefrom.

4. A spark suppressor, comprising:
   a plurality of vanes extending away from a center area of said passageway, said vanes causing air flowing therethrough to be intermixed; and
   said plurality of vanes further includes a plurality of inner central vanes and a plurality of outer peripheral vanes, said inner vanes having a downstream curvature of a first direction and said outer peripheral vanes having a downstream curvature of a second differing direction.

5. A spark suppressor, as claimed in claim 4, wherein:
   each vane has a leading edge and a trailing edge, said leading edge of at least one vane overlapping a trailing edge of an adjacent vane when viewing said suppressor from a longitudinal direction.

6. A spark suppressor, as claimed in claim 4, further including:
   a filtration system including a filter housing, a plurality of filtration elements removably mounted in said filter housing, an inlet duct connected to said filter housing for conveying particulate to be filtered, an outlet duct connected to said filter housing for conveying filtered air away from said filter housing, and means communicating with said filter housing for providing a flow of air through said filtration elements;
   and wherein said spark suppressor is mounted in line with said inlet duct.

7. A spark suppressor, comprising:
   a plurality of vanes extending away from a center area of said passageway, said vanes causing air flowing therethrough to be intermixed; and
   an air booster positioned upstream of said spark suppressor for providing a selected pulse of pressurized air to dislodge adhered particulate from said vanes.

8. A spark suppressor, as claimed in claim 7, wherein:
each vane has a leading edge and a trailing edge, said leading edge of at least one vane overlapping a trailing edge of an adjacent vane when viewing said suppressor from a longitudinal direction.

9. A spark suppressor, as claimed in claim 7, wherein:
said air booster includes a valve, a pressurized source of fluid flowing through said valve, and a distribution element for introducing the selected pulse of pressurized fluid into said passageway and releasing a pressure wave against said plurality of vanes.

10. A spark suppressor, as claimed in claim 7, further including:
a filtration system including a filter housing, a plurality of filtration elements removably mounted in said filter housing, an inlet duct connected to said filter housing for conveying particulate to be filtered, an outlet duct connected to said filter housing for conveying filtered air away from said filter housing, and means communicating with said filter housing for providing a flow of air through said filtration elements;
and wherein said spark suppressor is mounted in line with said inlet duct.

11. A spark suppressor for suppressing sparks moving through a duct having walls defining the passageway, said spark suppressor comprising:
a static air mixer portion including a plurality of stationary and radially extending vanes diverging away from a center area of said passageway;
an outer wrap defining an outer circumference of said passageway, said plurality of vanes including at least one vane having a distal end terminating at said outer wrap, said plurality of vanes each having a downstream curvature causing air flowing therethrough to be intermixed;
a first transition member installed upstream of said static air mixer portion, said first transition member having an upstream end connected to the duct, and a downstream end connected to said static air mixer portion, said downstream end having a larger diameter than said upstream end; and
a second transition member installed downstream of said static air mixer portion, said second transition member having an upstream end connected to the static air mixer portion and, and a downstream end connected to said duct, said upstream end of said second transition member having a larger diameter than said downstream end thereof.

12. A spark suppressor, as claimed in claim 11, wherein:
each vane has a leading edge and a trailing edge, said leading edge of at least one vane overlapping a trailing edge of an adjacent vane when viewing said suppressor from a longitudinal direction, and wherein at least one vane has a distal end that contacts an interior surface of the duct.

13. A method of suppressing sparks traveling through a passageway, said method comprising the steps of:
providing a duct having walls defining the passageway;
installing a spark suppressing device mounted transversely in the duct, said spark suppressor having a plurality of curved vanes remaining stationary in the duct, said plurality of vanes including a plurality of inner central vanes having a downstream curvature of a first direction and said plurality of vanes including a plurality of outer peripheral vanes having a downstream curvature of a second differing direction;
generating air flow through said duct causing said sparks to travel through said passageway and wherein at least some sparks impact said vanes; and
cooling said sparks by turbulent air flow created by said plurality of vanes.

14. A method, as claimed in claim 13, wherein:
said vanes being placed in an overlapping configuration, wherein a leading edge of at least one vane overlaps with a trailing edge of an adjacent vane when viewed from a longitudinal direction.

15. A method, as claimed in claim 13, wherein:
at least one vane has a distal end that contacts an interior surface of the duct.

\* \* \* \* \*

(12) EX PARTE REEXAMINATION CERTIFICATE (10629th)
United States Patent
Lindgren et al.

(10) Number: US 7,588,611 C1
(45) Certificate Issued: Jun. 10, 2015

(54) METHOD AND APPARATUS FOR SUPPRESSING SPARKS

(75) Inventors: Ross A. Lindgren, Centennial, CO (US); William O. Irvine, Lakewood, CO (US)

(73) Assignee: BLENDER PRODUCTS, INC., Denver, CO (US)

Reexamination Request:
No. 90/012,621, Sep. 14, 2012

Reexamination Certificate for:
Patent No.: 7,588,611
Issued: Sep. 15, 2009
Appl. No.: 12/147,266
Filed: Jun. 26, 2008

Related U.S. Application Data

(63) Continuation of application No. 11/064,657, filed on Feb. 23, 2005, now Pat. No. 7,416,573.

(51) Int. Cl.
*B01D 45/12* (2006.01)
*A62C 3/04* (2006.01)
*B01D 46/10* (2006.01)

(52) U.S. Cl.
CPC .. *A62C 3/04* (2013.01); *B01D 46/10* (2013.01)

(58) Field of Classification Search
CPC ....... A62C 3/04; B01D 46/0093; B01D 46/10

USPC .................................................. 55/DIG. 20
See application file for complete search history.

(56) References Cited

To view the complete listing of prior art documents cited during the proceeding for Reexamination Control Number 90/012,621, please refer to the USPTO's public Patent Application Information Retrieval (PAIR) system under the Display References tab.

*Primary Examiner* — Russell Stormer

(57) ABSTRACT

A spark suppression device includes a plurality of blades or vanes that are mounted transversely in a duct of an air handling/dust collection system communicating with a spark source. A controlled flow of air carries sparks from the spark source through the spark suppression device. Sparks are suppressed by turbulence created in the airstream from the blades that have a downstream curvature. The turbulence strips away a hot air bubble surrounding a spark ember, thereby effectively cooling the spark and significantly reducing combustion at the spark ember. Other attributes of the invention contributing to spark suppression include an overlapping arrangement of the blades that results in high-velocity impact of the sparks against the blades, thereby breaking up the spark embers into smaller embers, and creation of rapid increased pressure within the spark suppression device that also helps to strip away the spark ember from the surrounding hot air bubble.

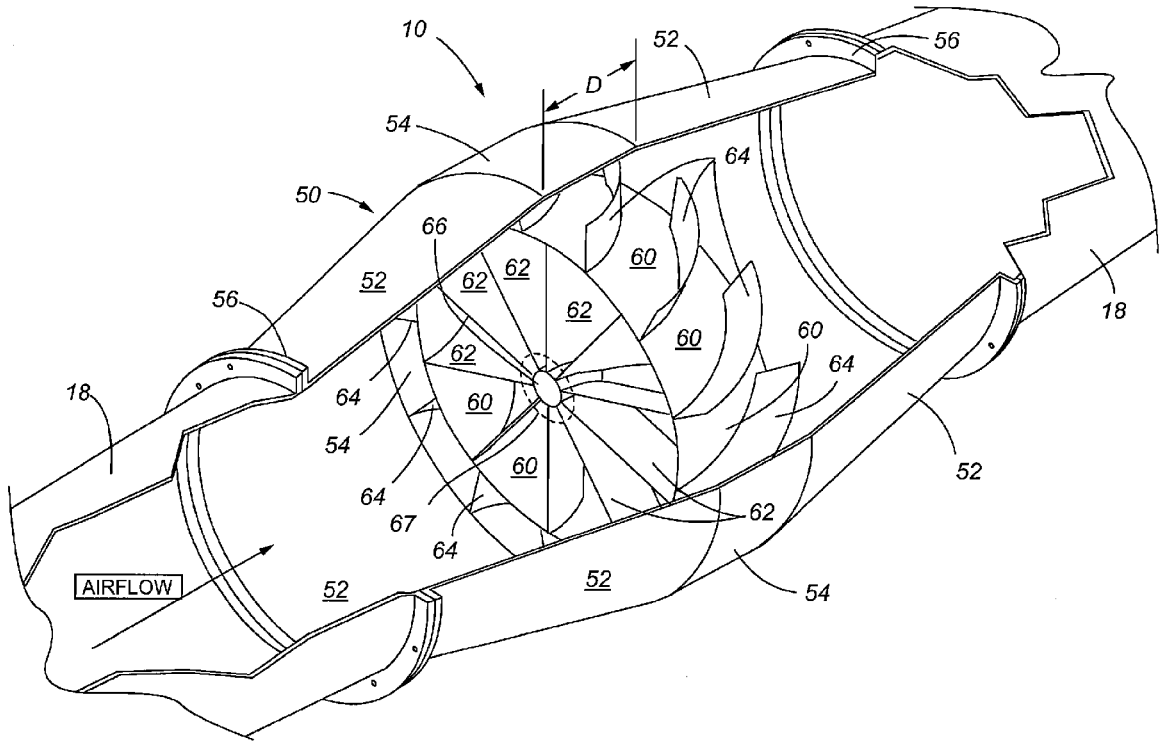

US 7,588,611 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE
SPECIFICATION AFFECTED BY AMENDMENT
ARE PRINTED HEREIN.

Column 7 lines 27-50:

Referring to FIG. [6] *7*, an elevation view taken along a longitudinal centerline of the preferred embodiment of FIG. 3 is illustrated. The leading or upstream edges 88 of the inner set of blades 62 are illustrated as continuous lines, while the trailing or downstream edges 90 of the blades 62 are illustrated as dashed lines. As shown, when viewed along the longitudinal centerline, for each inner blade, there is a definable overlap between the leading edge 88 of each inner blade and the trailing edge 90 of one adjacent inner blade. As the inner blades extend radially outward, the overlap may decrease; however, there is preferably no clear open gap between adjacent blades, which prevents sparks having a linear path of travel to pass unimpeded therethrough. Although it is theoretically possible for a spark to pass through the spark suppression device without actually contacting a blade, such clear passage could only occur if the spark rapidly changed direction as it passed through the device, which is a highly unlikely event at any flow rate. As previously mentioned, because a spark ember has a density greater than the surrounding airstream, the spark ember tends to maintain its linear direction of travel through the duct; therefore, the overlapping blade arrangement of the preferred embodiment causes virtually all sparks to make contact with the blades.

Column 7 lines 51-63:

Also shown in FIG. [6] *7* is the particular arrangement of the outer set of blades 64. The leading or upstream edges 92 of the outer set of blades 64 are illustrated as continuous lines, while the trailing or downstream edges 94 of the blades 64 are illustrated as dashed lines. A definable overlap also exists with respect to the leading edge of each outer blade and the trailing edge of one adjacent outer blade. Again, this overlap virtually eliminates the likelihood that a spark may simply pass through the outer set of blades without contacting the blades. In general, an increase in the depth of the blades, as measured by "D" in FIGS. 3 and 4, requires less curvature to achieve the same overlap between adjacent blades in preventing unobstructed passage of sparks.

AS A RESULT OF REEXAMINATION, IT HAS BEEN DETERMINED THAT:

Claims 2, 5, 8, 12 and 14 are cancelled.

Claims 1, 3, 4, 7, 10, 11 and 13 are determined to be patentable as amended.

Claims 6, 9 and 15, dependent on an amended claim, are determined to be patentable.

New claims 16-24 are added and determined to be patentable.

1. A spark suppressor for suppressing sparks moving through a duct having walls defining a passageway, said spark suppressor comprising:
   *a spark suppressing device for suppressing the sparks moving through the duct having the walls defining the passageway;*
   a plurality of stationary vanes extending away from a center area of said passageway, said plurality of vanes having at least one vane that extends to contact said duct, said vanes each having *a proximal end and a distal end, and* a downstream curvature causing air flowing therethrough to be intermixed, and wherein each vane has a leading edge and a trailing edge, said leading edge of at least one vane overlapping a trailing edge of an adjacent vane when viewing said suppressor from a longitudinal direction; and
   a filtration system including a filter housing, a plurality of filtration elements removably mounted in said filter housing, an inlet duct connected to said filter housing for conveying particulate to be filtered, an outlet duct connected to said filter housing for conveying filtered air away from said filter housing, and means communicating with said filter housing for providing a flow of air through said filtration elements; [and]
   wherein said spark suppressor is mounted in line with said inlet duct;
   *a central hub interconnecting said proximal ends of each of said vanes;*
   *said overlapping of said leading edge of said at least one vane with respect to said trailing edge of said adjacent vane extends from said proximal end of said at least one vane to said duct; and*
   *wherein each of said vanes have respective depths at said proximal and distal ends of said vanes, and wherein said depths of said proximal ends are less than said depths of said distal ends.*

3. A spark suppressor, as claimed in claim [2] *1*, wherein: said central hub includes a center plate that extends radially outward therefrom.

4. A spark suppressor, comprising:
   *a spark suppressing device for suppressing sparks moving through a duct having walls defining a passageway;*
   a plurality of vanes extending away from a center area of said passageway, said vanes causing air flowing therethrough to be intermixed; and said plurality of vanes further includes a plurality of inner central vanes and a plurality of outer peripheral vanes, said inner vanes having a downstream curvature of a first direction and said outer peripheral vanes having a downstream curvature of a second differing direction*;*
   *each inner central vane has a leading edge and a trailing edge, said leading edge of at least one inner central vane overlapping a trailing edge of an adjacent inner central vane when viewing said suppressor from a longitudinal direction; and*
   *wherein said leading edge extends continuously from a central hub to adjacent a corresponding outer peripheral vane, and said trailing edge extends continuously from said central hub to adjacent said corresponding outer peripheral vane, and said overlapping occurs continuously from said central hub to adjacent said corresponding outer peripheral vane, thereby eliminating* open gaps between inner central vanes when viewed from a longitudinal direction.

7. A spark suppressor, comprising:
- a spark suppressing device for suppressing sparks moving through a duct having walls defining a passageway;
- a plurality of vanes extending away from a center area of said passageway, said vanes causing air flowing therethrough to be intermixed; and
- an air booster positioned upstream of said spark suppressor for providing a selected pulse of pressurized air *directed downstream* to dislodge adhered particulate from said vane;
- *each vane having a proximal end and a distal end, and a leading edge and a trailing edge, said leading edge overlapping a trailing edge of an adjacent vane; and*
- *said leading edge extends continuously from a center area to said duct, said trailing edge extends continuously from said center area to said duct, and said overlapping of said leading edge of said at least one vane with respect to said trailing edge of said adjacent vane occurs continuously from said center area to said duct thereby eliminating open gaps between vanes; and*
- *wherein each of said vanes have respective depths at said proximal and distal ends of said vanes, and wherein said depths of said proximal ends are less than said depths of said distal ends.*

10. A spark suppressor, [as claimed in claim 7, further including] *comprising:*
- a spark suppressing device for suppressing sparks moving through a duct having walls;
- a plurality of vanes extending away from a center area of said passageway, said vanes causing air flowing therethrough to be intermixed;
- an air booster positioned upstream of said spark suppressor for providing a selected pulse of pressurized air directed downstream to dislodge adhered particulate from said vane;
- each vane having a leading edge and a trailing edge, said leading edge overlapping a trailing edge of an adjacent vane; and
- wherein said leading edge extends continuously from a center area to said duct, said trailing edge extends continuously from said center area to said duct, and said overlapping of said leading edge of said at least one vane with respect to said trailing edge of said adjacent vane occurs continuously from said center area to said duct thereby eliminating open gaps between vanes;
- a filtration system including a filter housing, a plurality of filtration elements removably mounted in said filter housing, an inlet duct connected to said filter housing for conveying particulate to be filtered, an outlet duct connected to said filter housing for conveying filtered air away from said filter housing, and means communicating with said filter housing for providing a flow of air through said filtration elements; and
- wherein said spark suppressor is mounted in line with said inlet duct *and upstream of said filtration system.*

11. A spark suppressor for suppressing sparks moving through a duct having walls defining the passageway, said spark suppressor comprising:
- *a spark suppressing device for suppressing the sparks moving through the duct having the walls defining the passageway;*
- a static air mixer portion including a plurality of stationary and radially extending vanes diverging away from a center area of said passageway;
- an outer wrap defining an outer circumference of said passageway, said plurality of vanes *each* including [at least one vane having] *a proximal end, and* a distal end terminating at said outer wrap, said plurality of vanes each having a downstream curvature causing air flowing therethrough to be intermixed;
- a first transition member installed upstream of said static air mixer portion, said first transition member having an upstream end connected to the duct, and a downstream end connected to said static air mixer portion, said downstream end having a larger diameter than said upstream end; [and]
- a second transition member installed downstream of said static air mixer portion, said second transition member having an upstream end connected to the static air mixer portion and, and a downstream end connected to said duct, said upstream end of said second transition member having a larger diameter than said downstream end thereof;
- each vane has a leading edge and a trailing edge, said leading edge of at least one vane continuously overlapping a trailing edge of an adjacent vane, and wherein said distal end of at least one vane contacts an interior surface of the duct;
- at least said first transition member creates an enlarged entrance section by said larger diameter of said downstream end as compared to the duct, providing a sudden entrance expansion thereby creating a pressure increase for air passing through said device; and
- wherein each of said vanes have respective depths at said proximal and distal ends, and wherein said depths of said proximal ends are less than said depths of said distal ends.

13. A method of suppressing sparks traveling through a passageway, said method comprising the steps of:
- providing a duct having walls defining the passageway;
- installing a spark suppressing device mounted transversely in the duct, said spark suppressor having a plurality of curved vanes remaining stationary in the duct, said plurality of vanes including a plurality of inner central vanes having a downstream curvature of a first direction and said plurality of vanes including a plurality of outer peripheral vanes having a downstream curvature of a second differing direction;
- generating air flow through said duct causing said sparks to travel through said passageway and wherein at least some sparks impact said vanes; [and]
- cooling said sparks by turbulent air flow created by said plurality of vanes;
- *said plurality of inner central vanes being placed in an overlapping configuration, wherein a leading edge of at least one inner central vane overlaps with a trailing edge of an adjacent inner central vane when viewed from a longitudinal direction; and*
- *wherein said leading edge extends continuously from a central area to adjacent a corresponding outer peripheral vane, said trailing edge extends continuously from a central area to adjacent said corresponding outer peripheral vane, and said overlapping occurs continuously from said central area to adjacent said corresponding outer peripheral vane thereby eliminating open gaps between inner central vanes when viewed from a longitudinal direction.*

16. A spark suppressor as claimed in claim 1, wherein:
- *said leading edge extends continuously from said central hub to said duct, said trailing edge extends continuously from said central hub to said duct, and said overlapping* occurs continuously from said central hub to said duct thereby eliminating open gaps between vanes when viewed from a longitudinal direction.

17. A spark suppressor as claimed in claim 11, further including:
  a first flange integral with said upstream end of said first transition member and a second flange integral with said downstream end of said second transition member, said first and second flanges enabling said device to be mounted in line with said duct.

18. A method as claimed in claim 13, further including:
  lowering temperatures of sparks travelling through said passageway to within 50° F. of a surrounding airstream.

19. A method as claimed in claim 13, further including:
  lowering temperatures of sparks travelling through said passageway to within 50° F. of a surrounding airstream at a location downstream beyond the device from turbulence created by the vanes.

20. A spark suppressor as claimed in claim 1, wherein:
  said overlapping of said at least one vane and said adjacent vane decreases as said at least one vane and said adjacent vane extend radially outward.

21. A spark suppressor as claimed in claim 7, wherein:
  said overlapping of said at least one vane and said adjacent vane decreases as said at least one vane and said adjacent vane extend radially outward.

22. A spark suppressor as claimed in claim 11, wherein:
  said overlapping of said at least one vane and said adjacent vane decreases as said at least one vane and said adjacent vane extend radially outward.

23. A spark suppressor as claimed in claim 1, wherein:
  said overlapping of said leading edge of said at least one vane with respect to said trailing edge of said adjacent vane extends continuously from the proximal end of said at least one vane to said duct.

24. A spark suppressor as claimed in claim 11, wherein:
  said overlapping of said leading edge of said at least one vane and said trailing edge of said adjacent vane extends from said center area of said passageway to the duct.

* * * * *